United States Patent
Goade, Sr.

[11] Patent Number: 5,921,584
[45] Date of Patent: Jul. 13, 1999

[54] CARD DISPLAY PACKAGE

[75] Inventor: Ron E. Goade, Sr., Edmond, Okla.

[73] Assignee: SSI Photo I.D., Edmond, Okla.

[21] Appl. No.: 08/761,736

[22] Filed: Dec. 5, 1996

Related U.S. Application Data

[63] Continuation-in-part of application No. 08/497,186, Jun. 30, 1995, Pat. No. 5,720,158.

[51] Int. Cl.$^6$ .................................................. B42D 15/00
[52] U.S. Cl. .............................. 283/107; 283/61; 283/62; 283/56; 281/2; 281/5
[58] Field of Search ........................... 281/2, 5; 283/61, 283/62, 107, 108, 109, 110, 74, 75, 82, 56

[56] References Cited

U.S. PATENT DOCUMENTS

| | | | |
|---|---|---|---|
| 4,887,763 | 12/1989 | Sano | 229/71 |
| 4,982,894 | 1/1991 | Schmidt | 229/69 |
| 5,096,229 | 3/1992 | Carlson | 283/75 |
| 5,233,812 | 8/1993 | Coppola | 53/411 |
| 5,281,799 | 1/1994 | McIntire et al. | 281/5 |
| 5,410,136 | 4/1995 | Mcintire et al. | 281/5 |
| 5,427,416 | 6/1995 | Birch | 283/109 |
| 5,433,364 | 7/1995 | Hill et al. | 225/96 |
| 5,439,255 | 8/1995 | McIntire et al. | 283/62 |
| 5,522,956 | 6/1996 | McCannel | 156/209 |
| 5,529,345 | 6/1996 | Kohls | 283/75 |
| 5,531,482 | 7/1996 | Blank | 283/62 |
| 5,541,395 | 7/1996 | Hill et al. | 235/380 |
| 5,609,253 | 3/1997 | Goade, Sr. | 283/101 |
| 5,640,447 | 6/1997 | Fonseca | 235/380 X |
| 5,650,209 | 7/1997 | Ramsburg et al. | 283/107 |
| 5,660,896 | 8/1997 | Normand et al. | 428/13 |

Primary Examiner—Frances Han
Attorney, Agent, or Firm—Dunlap, Codding & Rogers, P.C.

[57] ABSTRACT

A card display package and method for manufacturing same is provided. The card package includes a card carrier constructed of a synthetic sheet of paper laminated with a plastic material. The card package further includes a card constructed of the synthetic sheet of paper and laminated with the plastic material and having at least a portion of the card projecting from the card carrier. The card is integrally formed with and selectively detachable from the card carrier and is provided with an encodable magnetic strip extending transversely across the portion of the card projecting from the card carrier whereby the card may be swiped through an encoding device without removing the card from the card carrier.

12 Claims, 6 Drawing Sheets

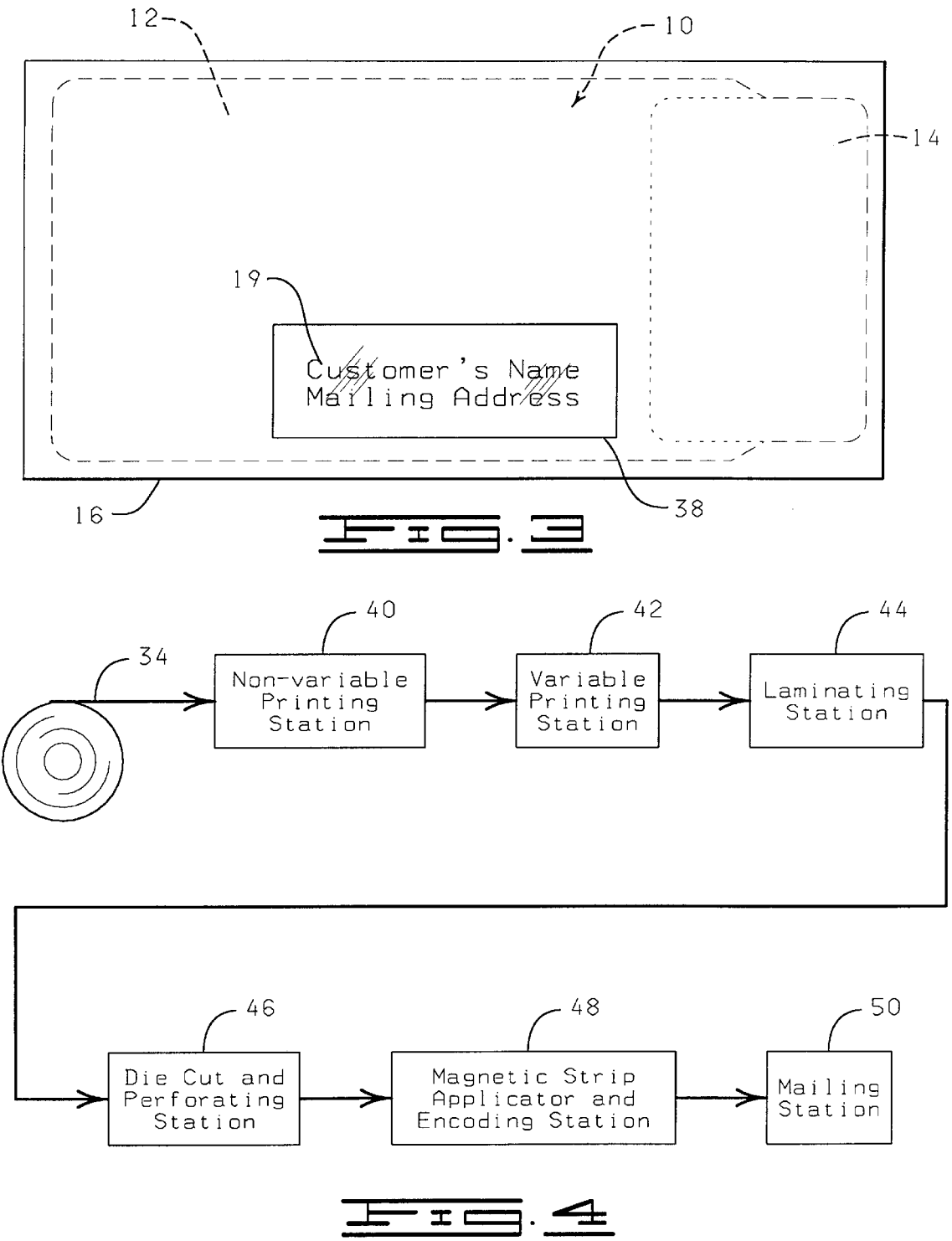

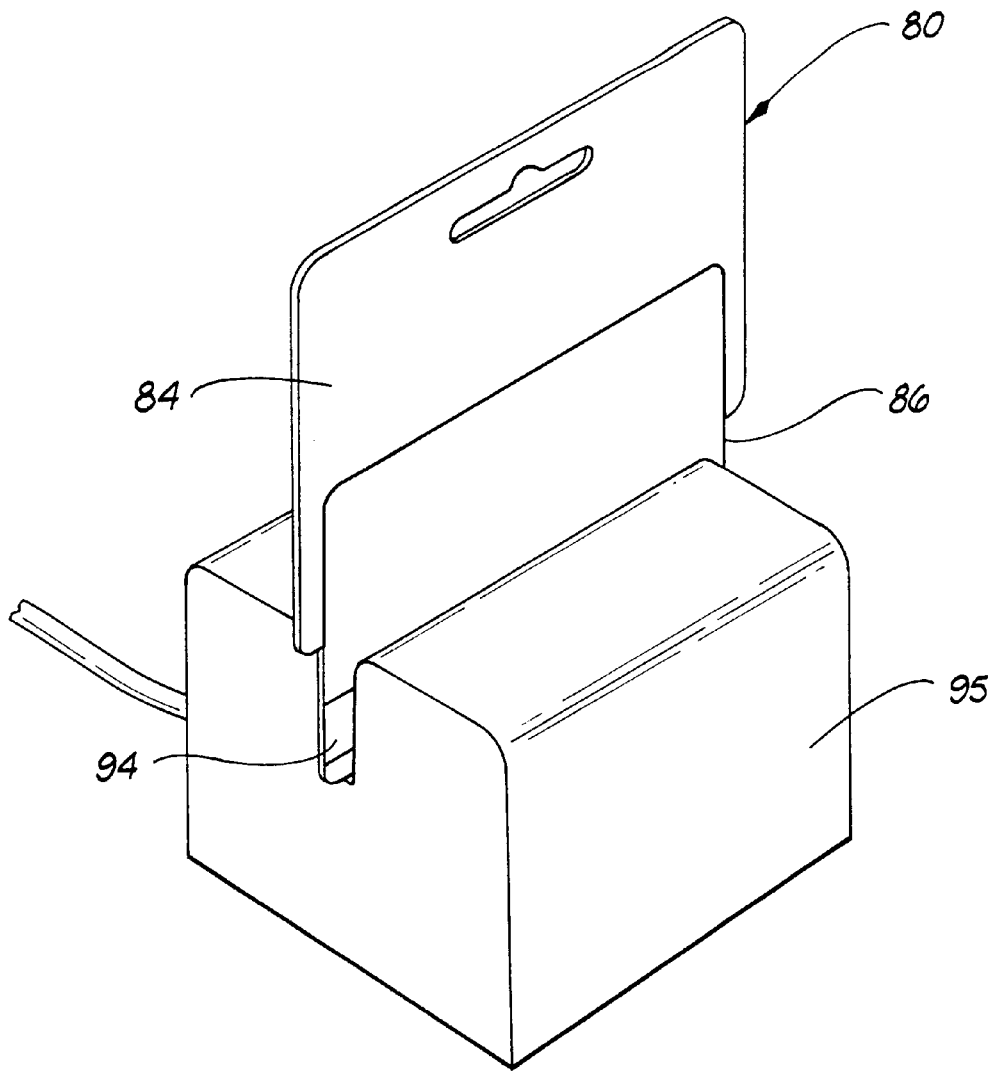
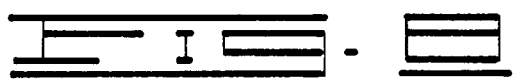
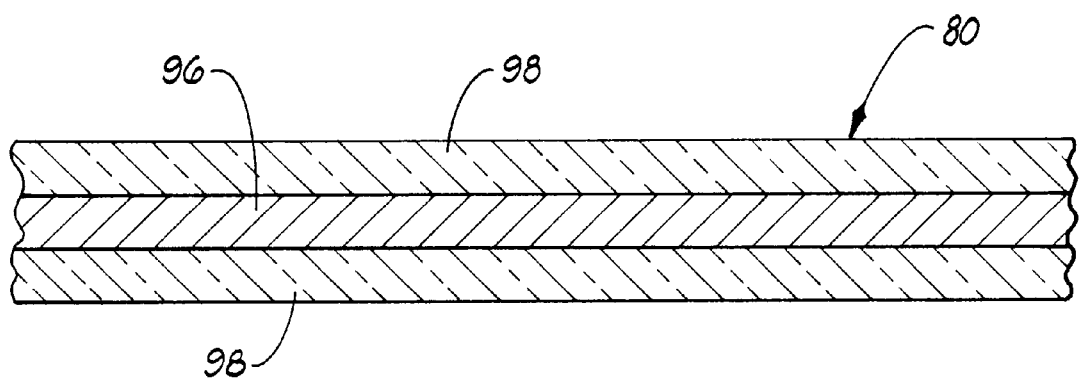

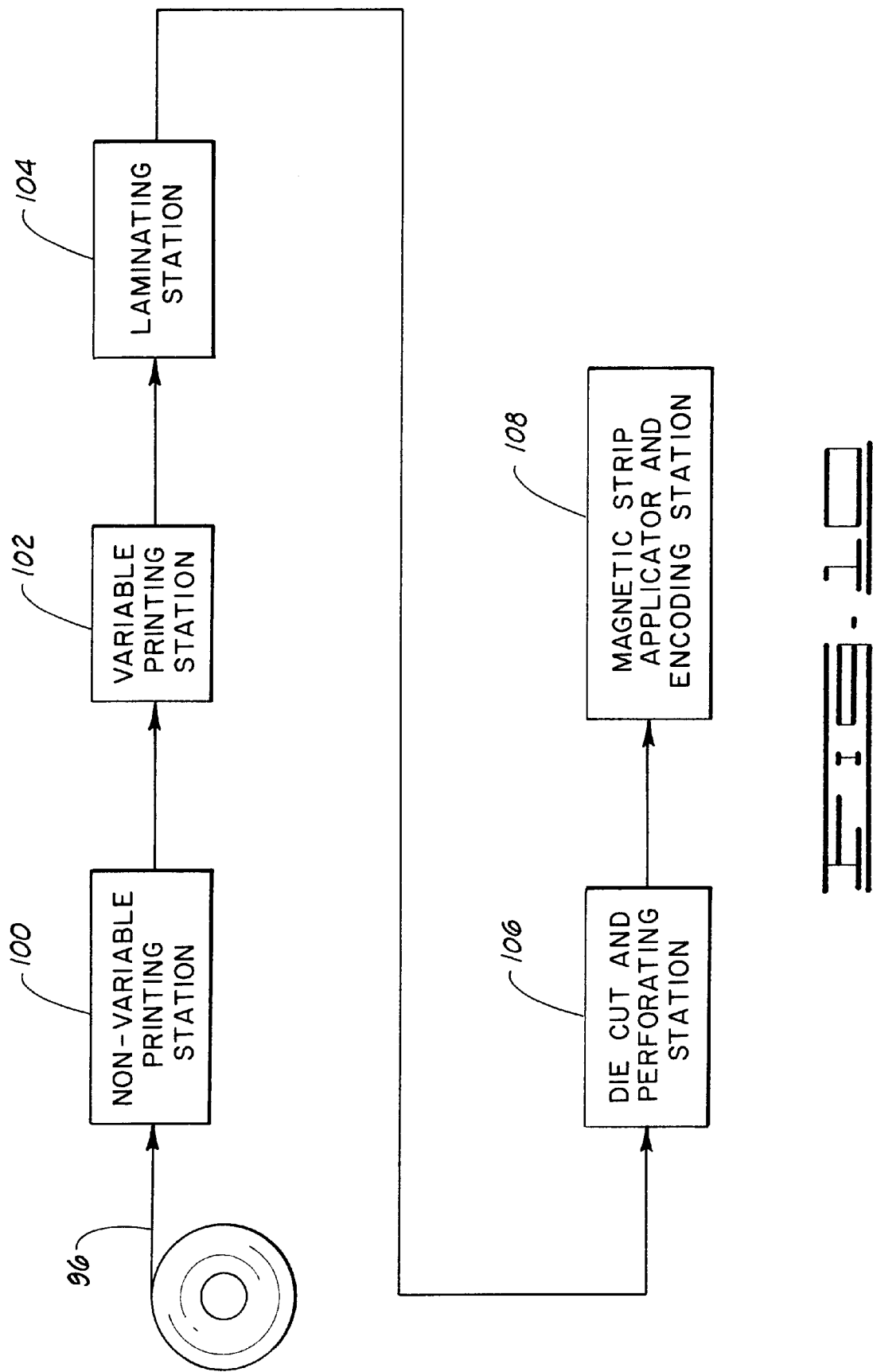

CARD DISPLAY PACKAGE

CROSS-REFERENCE TO RELATED APPLICATIONS

This application is a continuation-in-part of U.S. Ser. No. 08/497,186, filed Jun. 30, 1995, entitled INFORMATION CARD PACKAGE now U.S. Pat. No. 5,720,158.

STATEMENT REGARDING FEDERALLY SPONSORED RESEARCH OR DEVELOPMENT

Not applicable.

BACKGROUND OF THE INVENTION

1. Field of the Invention

The present invention relates generally to packaging, and more particularly, but not by way of limitation, to an improved card display package and method of manufacturing same.

2. Description of Related Art

Membership or identification cards distributed by businesses and organizations are typically forwarded to individuals by mailing the cards to the individual after the cards have been prepared. These cards are often used to provide authorization for the rental or purchase of goods and services or used as a gift certificate by granting the holder credit for various goods and services. It is common practice to forward such cards to customers in the mail by attaching the cards to a sheet of material, know as a carrier, and inserting the carrier and attached card into an envelope.

The carrier functions to hold the card within the envelope and provides a space for displaying additional information, such as a customer's name and address, company logos, instructions for the use of the card and promotional information related to the establishment distributing the card. The use of a carrier requires a multiple step process to prepare the card and carrier for mailing. First, the card is provided with certain non-variable information such as company logos, instructions, and promotional information. The card is also provided with certain unique customer information such as a customer's name and address or other personal information.

The carrier is prepared by cutting the carrier to the designated size, typically letter size, and then providing the carrier with the variable data which will include the customer's name and mailing address, possibly instructions for the use of the card and promotional information related to the establishment distributing the card. The carrier must then be correctly matched with the corresponding card which has been separately prepared. Once the carrier and the card are correctly matched, the card is attached to the carrier normally with an adhesive or by inserting the card into a plurality of slits formed in the carrier. The card and carrier are then inserted into an envelope which is sealed and mailed or otherwise delivered to the customer.

In many instances, it is necessary to attach a second card to the carrier. This requires the preparation of another card, matching the second card with the carrier and attaching the second card to the carrier. Furthermore, the weight of the contents in the envelope are increased and thus the mailing costs are increased.

As a result of the complexity and relatively high cost of preparing and delivering an identification card or membership card to a customer, a need exists for an improved card package that is durable and easy to handle and a method of preparing the card package for delivering the card to a customer which requires fewer production steps and results in reduced material and mailing costs.

In addition to or in lieu of mailing cards to customers, the purchase and usage of debit cards has continued to increase in recent years to the point that the sale of debit cards today is a multi-billion dollar industry. Often debit cards are printed and issued with a predetermined balance and typically sold as a retail item. An example of such a card is a prepaid calling card which provides an individual with a set dollar amount of long distance telephone calls. The account is accessed and debited by using an account number provided on the calling card.

A problem experienced in the sale of such debit cards is that merchants buying these cards are subsequently more exposed to loss through shrinkage and theft. In addition, the merchant must maintain inventory stock of different values of these debit cards well in advance of when the debit cards are actually sold as a retail item, thus restricting working capital.

With these problems in mind, merchants have begun to display non-activated (zero balance) debit cards whereby the merchant no longer has a large initial expenditure since the non-activated debit cards have no initial intrinsic value, and thus, theft is no longer a concern since the non-activated debit cards have very little value. Upon purchase of the debit card, the merchant encodes the debit card with a balance representing an amount a consumer wishes to attribute to the debit card.

In light of the fact that the consumer must have the card encoded after the card is purchased, it is desirable to the merchant to be able to encode the card without having to first remove the card from packaging in which the card is displayed. It is to such an improved card package that the present invention is directed.

BRIEF SUMMARY OF THE INVENTION

In one aspect, the present invention is directed to a card display package which includes a card carrier constructed of a synthetic sheet of paper laminated with a plastic material. The card package further includes a card constructed of the synthetic sheet of paper and laminated with the plastic material and having at least a portion of the card projecting from the card carrier. The card is integrally formed with and selectively detachable from the card carrier and is provided with an encodable magnetic strip extending transversely across the portion of the card projecting from the card carrier whereby the card may be swiped through an encoding device without removing the card from the card carrier.

In another aspect, the present invention is directed to a method of manufacturing a card display package. The method includes the steps of (1) laminating a sheet of material with a plastic material; (2) cutting the laminated sheet of material to a predetermined size and shape; (3) perforating the laminated sheet of material so as to define a card carrier and a card wherein the card remains integrally formed with the card carrier while being selectively detachable therefrom and at least a portion of the card projects from the card carrier; and (4) disposing an encodable magnetic strip transversely across the portion of the card projecting from the card carrier whereby the card may be swiped through an encoding device without removing the card from the card carrier.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 3 is an elevational view of the card package of the present invention shown inserted into an envelope.

FIG. 4 is a block diagram of the method used in the present invention.

FIG. 8 is a perspective view illustrating the card display package of the present invention being swiped through an encoding device.

FIG. 9 is a fragmented cross sectional view of the card display package of FIG. 6.

FIG. 10 is a block diagram schematically illustrating the method of manufacturing the card display package of FIG. 6.

DETAILED DESCRIPTION OF THE INVENTION

Figure 1:
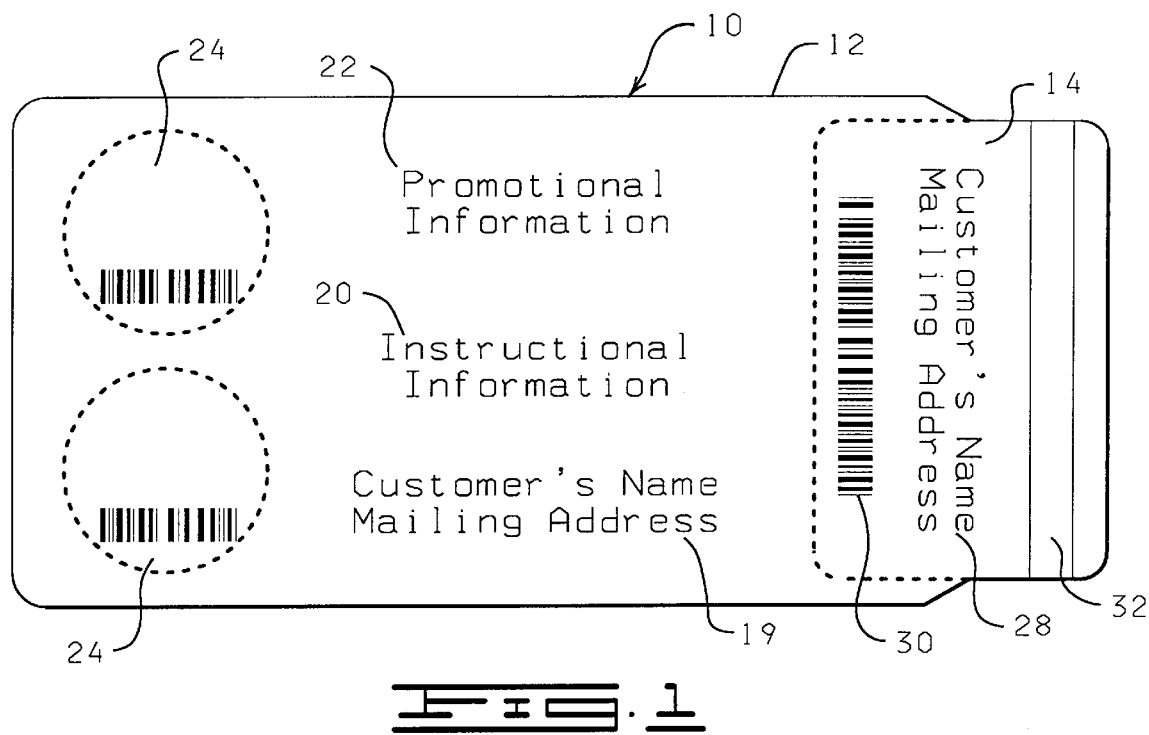
FIG. 1 is a back elevational view of a card package constructed in accordance with the present invention having a single information card defined thereon.

Referring now to the drawings, and more particularly to FIG. 1, a card package 10 constructed in accordance with the present invention is shown. The card package 10 includes a card carrier 12 and an information card 14, such as a membership card or an identification card. The information card 14 is integrally formed with and selectively detachable from the card carrier 12 such that a unitary card package is provided which is sized to be inserted into an envelope 16 (FIG. 3).

As mentioned above, a card carrier serves to hold the card so that the card is not able to shift about the envelope when the card is disposed in an envelope. In addition, the card carrier provides a space for displaying additional information. To this end, the card carrier 12 is provided with unique customer data which may include a customer's name and mailing address 19. The card carrier 12 may also be provided with non-variable information which may include, for example, instructional information 20 to explain how to use the information card 14 and promotional information 22 related to the establishment distributing the information card 14. The card carrier 12 may also include special function elements 24 that are selectively detachable from the card carrier 12.

Similarly, the information card 14 is provided with unique customer data which may include, for example, the customer's name and mailing address 28, encoded information in the form of a bar code 30 and/or a magnetic strip 32. The customer data on the information card 14 corresponds to the customer data on the card carrier 12. The information card 14 is shown to be the size and shape of a conventional credit type card; however, it will be appreciated that the information card 14 can be formed into a variety of shapes and sizes.

Figure 2:
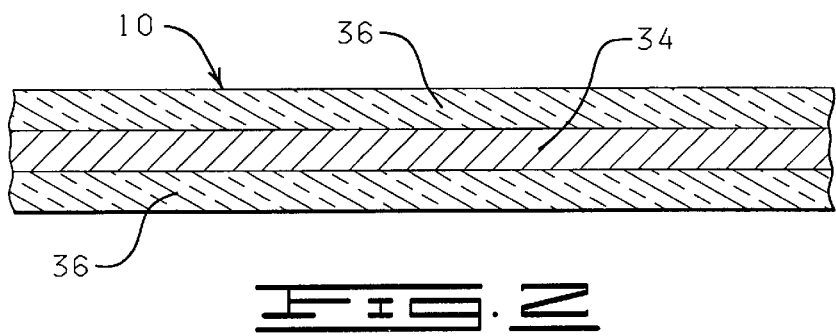
FIG. 2 is a fragmented cross sectional view of the card package of FIG. 1.

FIG. 2 illustrates the card package 10 as being constructed of a sheet of material 34 laminated on each side thereof with a transparent plastic material 36, such as a polyester/polyethylene material. The sheet of material 34 is preferably a synthetic paper, such as teslin, but any durable material capable of receiving printed matter or encodable matter can be used. The plastic material 36 provides the sheet of material 34 with a protective cover to increase the life of the card package 10 and provides the card package 10 with a certain degree of rigidity which facilitates the handling of the card package 10. The plastic material 36 is bonded to the sheet of material 34 in a conventional manner well known in the art.

FIG. 3 illustrates the card package 10 (depicted by dash lines) disposed in the envelope 16. The envelope 16 shown in FIG. 3 is a letter size envelope with a window 38 formed therein. The customer's name and mailing address 19 is disposed on the card carrier 12 such that the customer's name and mailing address 19 is viewable through the window 38 when the card package 10 is inserted into the envelope 16. By utilizing the customer's name and mailing address 19 on the card carrier 12, the step of preparing a personalized envelope for mailing the card package 10 is eliminated.

Referring now to FIG. 4, the card package 10 is formed by first passing the sheet of material 34 through a non-variable printing station 40 where the non-variable data of the card package 10, such as art work, any instructional information 20 and promotional information 22 is disposed on a first portion of the sheet of material 34 that will cooperate to define the card carrier 12 and on a second portion of the sheet of material 34 that will cooperate to define the information card 14. It will be appreciated that data can be disposed on each side of the sheet of material 34. The sheet of material 34 is next passed through a variable printing station 42 where the unique customer data which may include the customer's name and mailing address 19 and 28 and encoded data and bar codes 30 are disposed on the first and second portions of the sheet of material 34, respectively.

After the unique customer data has been disposed on the sheet of material 34, the sheet of material 34 is passed through a laminating station 44 where each side of the sheet of material 34 is laminated with the plastic material 36 in a conventional manner.

The laminated sheet of material 34 is then passed through a cutting die and perforating station 46 where the laminated sheet of material 34 is cut to the desired size, for example, to fit within a letter sized envelope in a flat condition. The laminated sheet of material 34 is perforated so as to define the information card 14 having the customer data on the second portion of the sheet of material 34 disposed thereon and so as to define the card carrier 12 having the customer data on the first portion of the sheet of material 34 disposed thereon. The sheet of material 34 is perforated such that the information card 14 remains integrally formed with the card carrier 12 while being selectively detachable therefrom. The laminated sheet of material 34 may further be perforated to define the special function elements 24.

With the card package 10 sized and shaped, the card package 10 is passed through a magnetic strip applicator and encoder station 48 to apply and encode the magnetic strip 32, if applicable.

To prepare the card package 10 for delivery to a customer, the card carrier 12 and the integrally formed information card 14 are passed through a mailing station 50 where the card carrier 12 and the integrally formed information card 14 are inserted into an envelope, such as the envelope 16 illustrated in FIG. 3. The card carrier 12 and the integrally formed information card 14 are inserted into the envelope 16 such that the customer's name and mailing address 19 located on the card carrier 12 is viewable through the window of the envelope 16 when the card carrier 12 and the information card 14 are inserted into the envelope 16. By utilizing the envelope 16, the need to prepare a personalized envelope and match the correct envelope with the corresponding card package 10 is eliminated thereby reducing cost.

To utilize the information card 14, the customer merely removes the card package 10 from the envelope 16 and detaches the information card 14 from the card carrier 12. The information card 14 can be easily carried in the customer's wallet or purse.

Figure 5:
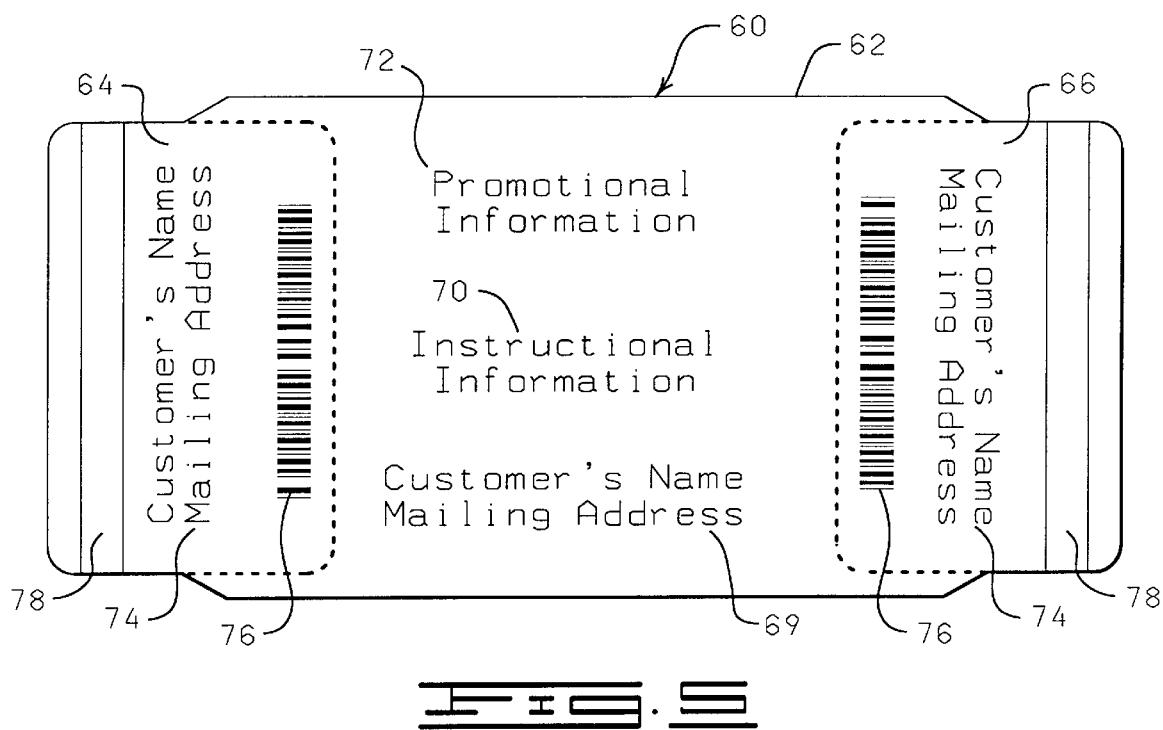
FIG. 5 is a back elevational view of a card package constructed in accordance with the present invention having a pair of information cards defined thereon.

Referring now to FIG. 5, another embodiment of a card package 60 constructed in accordance with the present invention is illustrated. The card package 60 includes a card carrier 62 and a pair of information cards 64 and 66. Each information card 64 and 66 is integrally formed with and selectively detachable from the card carrier 62 such that a unitary card package is provided which is sized to be inserted into an envelope, such as the envelope 16 depicted in FIG. 3.

Like the card carrier 12, the card carrier 62 is provided with unique customer data which may include the customer's name and mailing address 69. The card carrier 62 may also be provided with non-variable data which may include instructional information 70 to explain how to use the information cards 64 and 66 and promotional information 72 related to the establishment distributing the card. The card carrier 62 may also include special function elements (not shown) which are similar to those illustrated in FIG. 1.

The information cards 64 and 66 are each provided with unique customer data which may include, for example, the customer's name and mailing address 74, encoded information in the form of a bar code 76 and/or a magnetic strip 78. The customer data on the information cards 64 and 66 corresponds to the customer data on the card carrier 62. The information cards 64 are 66 are shown to be the size and shape of a conventional credit type card; however, it will be appreciated that the information cards 64 and 66 can be formed into a variety of shapes and sizes.

Figure 6:
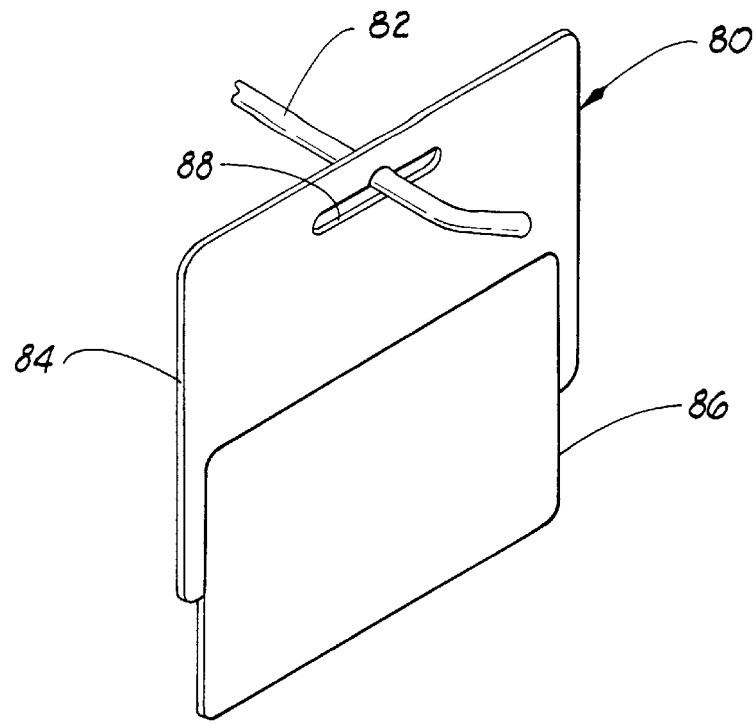
FIG. 6 is a perspective view of a card display package constructed in accordance with the present invention shown suspended from a display peg.

Referring now to FIG. 6, a card display package 80 constructed in accordance with the present invention is shown suspended from a display peg 82. The card display package 80 includes a card carrier 84 and a card 86, such as a debit card. The card 86 is integrally formed with the card carrier 84 such that a unitary card display package is provided. By forming the card display package 80 as a unitary unit, the card 86 is easily and conveniently displayed as a retail item at a point of purchase without requiring any additional packaging. Furthermore, the card 86 is formed with the card carrier 84 so that the card 86 is selectively detachable from the card carrier 84 for subsequent use of the card 86.

The card display package 80 has a flat or planar configuration with the card 86 formed in a coplanar relationship with the card carrier 84. It will be appreciated by those of ordinary skill in the art that the flat configuration of the card display package 80 will result in reduced shipping and storage costs. The card carrier 84 is provided with a peg receiving aperture 88 near one end thereof to enable the debit card display package 80 to be conveniently displayed from the peg 82 or other similar device.

Figure 7:
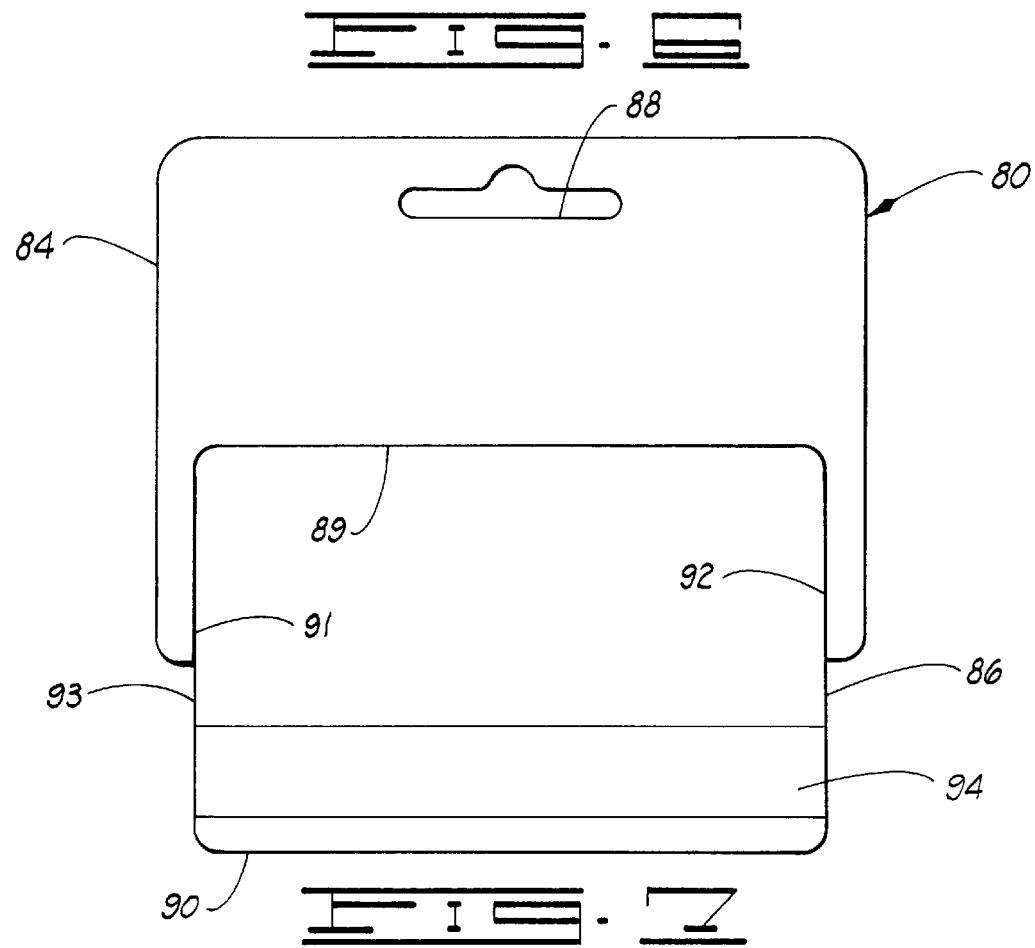
FIG. 7 is a back plan view of the card display package of the present invention.

Referring now to FIG. 7, the card 86 is shown to be sized and shaped to resemble a conventional credit type card. That is, the card 86 is characterized as having a first side 89, a second side 90, a third side 91, and a fourth side 92. It will be appreciated by those of ordinary skill in the art, however, that the card 86 can be formed into a variety of shapes and sizes.

The card 86 is integrally formed with the card carrier 84 so that a portion 93 of the card 86 projects from the card carrier 84. More specifically, the card 86 is integrally formed with the card carrier 84 so that the first side 89 and a portion of the third and fourth sides 91 and 92 of the card 86 border the card carrier 84, and the second side 90 and a remaining portion of the third and fourth sides 91 and 92 extend beyond the card carrier 84.

The card 86 is provided with an encodable magnetic strip 94 on at least one side thereof. The magnetic strip 94 is applied to the card 86 so that the magnetic strip 94 extends transversely across the card 86 between the third side 91 and the fourth side 92 along the portion 93 of the card 86 projecting from the card carrier 84. It will be appreciated that the unique configuration of the card display package 80 enables the card 86 to be swiped through an encoding device 95 to encode the magnetic strip 94, in a manner illustrated in FIG. 8, without having to first detach the card 86 from the card carrier 84.

The card carrier 84 serves to support the card 86 so that the card 86 can be visibly displayed as a retail item. In addition, the card carrier 84 provides space for displaying additional information, such as instructional and promotional information.

The card display package 80 is constructed in a manner similar to that described above in reference to the card package 10. That is, as illustrated in FIG. 9, the card display package 80 is constructed of a sheet of material 96 laminated on each side thereof with a transparent plastic material 98, such as a polyester/polyethylene material. The sheet of material 96 is preferably a synthetic paper, such as teslin, but any durable material capable of receiving printed matter or encodable matter can be used. The plastic material 98 provides the sheet of material 96 with a protective cover to increase the life of the card display package 80 and provides the card display package 80 with a certain degree of rigidity which facilitates the handling of the card display package 80. The plastic material 98 is bonded to the sheet of material 96 in a conventional manner well known in the art.

Referring now to FIG. 10, it will be understood that the card display package 80 is also formed in a manner similar to that described above in reference to the card package 10. The card display package 80 is formed by first passing the sheet of material 96 through a non-variable printing station 100 to apply art work, instructional data and promotional information on a first portion of the sheet of material 96 that will define the card carrier 84 and on a second portion of the sheet of material 96 that will define the card 86. It will be appreciated that data can be disposed on each side of the sheet of material 96. The sheet of material 96 is next passed through a variable printing station 102 where the variable data, which may include encoded data and bar codes, is applied on the second portion of the sheet of material 96, respectively.

The sheet of material 96 is next passed through a laminating station 104 where each side of the sheet of material 96 is laminated with the plastic material 98 in a conventional manner.

The laminated sheet of material 96 is then passed through a cutting die and perforating station 106 where the laminated sheet of material 96 is cut to the desired size. The laminated sheet of material 96 is perforated so as to define the card 86 with the portion 93 of the card 86 projecting from the card carrier 84. The sheet of material 96 is perforated so that the card 86 remains integrally formed with the card carrier 84 while being selectively detachable therefrom. The laminated sheet of material 96 is further cut to form the peg receiving aperture 88.

With the card display package 80 sized and shaped, the card display package 80 is passed through a magnetic strip applicator and encoder station 108 to apply the magnetic strip 94 and encode the magnetic strip 94, if applicable.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A card display package, comprising:
    a card carrier constructed of a sheet of material; and
    a card connected to and selectively detachable from the card carrier, the card having a portion thereof extending beyond an outer edge of the card carrier and the card having an encodable magnetic strip extending transversely across the portion of the card extending beyond the outer edge of the card carrier.

2. The card display package of claim 1 wherein the card and the card carrier are formed in a coplanar relationship.

3. The card display package of claim 1 wherein the card carrier is provided with an aperture for suspending the card carrier from a display peg.

4. The card package of claim 1 wherein the sheet of material is a synthetic paper.

5. The card package of claim 1 wherein each side of the sheet of material is laminated with a plastic material.

6. The card package of claim 5 wherein the plastic material is polyester/polyethylene.

7. A card display package, comprising:
    a card carrier constructed of a sheet of material; and
    a card having a first side, a second side, a third side, and a fourth side, the card connected to the card carrier so that the first side and a portion of the third and fourth sides of the card border the card carrier and the second side and a remaining portion of the third and fourth sides extend beyond the card carrier, the card having an encodable magnetic strip extending transversely across the card between the portions of the third side and the fourth side extending beyond the card carrier.

8. The card display package of claim 7 wherein the card and the card carrier are formed in a coplanar relationship.

9. The card display package of claim 7 wherein the card carrier is provided with an aperture for suspending the card carrier from a display peg.

10. The card package of claim 7 wherein the sheet of material is a synthetic paper.

11. The card package of claim 7 wherein each side of the sheet of material is laminated with a plastic material.

12. The card package of claim 7 wherein the plastic material is polyester/polyethylene.

* * * * *

UNITED STATES PATENT AND TRADEMARK OFFICE
CERTIFICATE OF CORRECTION

| | | |
|---|---|---|
| PATENT NO. | : 5,921,584 C1 | |
| APPLICATION NO. | : 08/761736 | |
| DATED | : November 15, 2005 | |
| INVENTOR(S) | : Ron E. Goade, Sr. | |

It is certified that error appears in the above-identified patent and that said Letters Patent is hereby corrected as shown below:

Page 1 (Title Page), (73) the Assignee should read:

--Advanced Card Technologies LLC, Suffern, NY (US)--

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 5,921,584 C1
APPLICATION NO. : 90/006442
DATED : November 15, 2005
INVENTOR(S) : Ron E. Goade, Sr.

It is certified that error appears in the above-identified patent and that said Letters Patent is hereby corrected as shown below:

Page 1 (Title Page), (73) the Assignee should read:

--Advanced Card Technologies LLC, Suffern, NY (US)--

This certificate supersedes the Certificate of Correction issued May 20, 2008.

Signed and Sealed this

Seventeenth Day of June, 2008

JON W. DUDAS
*Director of the United States Patent and Trademark Office*

(12) EX PARTE REEXAMINATION CERTIFICATE (5229th)
United States Patent
Goade, Sr.

(10) Number: US 5,921,584 C1
(45) Certificate Issued: Nov. 15, 2005

(54) CARD DISPLAY PACKAGE

(75) Inventor: Ron E. Goade, Sr., Edmond, OK (US)

(73) Assignee: Vanguard Indentification Systems, Inc., West Chester, PA (US)

Reexamination Request:
No. 90/006,442, Nov. 5, 2002
No. 90/006,796, Oct. 15, 2003

Reexamination Certificate for:
Patent No.: 5,921,584
Issued: Jul. 13, 1999
Appl. No.: 08/761,736
Filed: Dec. 5, 1996

Related U.S. Application Data

(63) Continuation-in-part of application No. 08/497,186, filed on Jun. 30, 1995, now Pat. No. 5,720,158.

(51) Int. Cl.[7] .............................................. B42D 15/00
(52) U.S. Cl. .......................... 283/107; 283/61; 283/62; 283/56; 281/2; 281/5
(58) Field of Search .......................... 281/2, 5; 283/56, 283/61, 62, 74, 75, 82, 107–110, 904; 206/806

(56) References Cited

U.S. PATENT DOCUMENTS

| | | | |
|---|---|---|---|
| 1,853,622 A | * | 4/1932 | Kennedy ...................... 281/29 |
| 2,616,612 A | | 11/1952 | Guttman |
| 3,583,317 A | | 6/1971 | Gibson |
| 4,204,639 A | * | 5/1980 | Barber et al. ................ 235/488 |
| 4,462,175 A | * | 7/1984 | Romberger ...................... 40/1 |
| 4,957,311 A | | 9/1990 | Geisenheimer |
| 4,978,146 A | | 12/1990 | Warther et al. |
| 4,978,146 A | | 12/1990 | Warther |
| 5,076,490 A | * | 12/1991 | Dulin ........................... 283/56 |
| 5,299,835 A | * | 4/1994 | Sonnenberg .................. 283/56 |
| 5,495,981 A | | 3/1996 | Warther |
| 5,522,956 A | | 6/1996 | McCannel |
| 5,769,457 A | | 6/1998 | Warther |
| 5,918,909 A | | 7/1999 | Fiala |

FOREIGN PATENT DOCUMENTS

GB  2281714  3/1995

OTHER PUBLICATIONS

Passenger Services Conference Resolutions Manual, 11th Edition, pp. 157–163.
Press release from Director General from Elections of Quebec dated Nov. 28, 2001 discussing, in part, Mexican Voter I.D. card.
Photocopy of Mexican Voter I.D. Card.
Did you know? The first credit card was issued in 1951, www.didyouknow.cd/credit cards.htm.
Similux Plastics catalogue, Feb. 1983.
Pilgrim catalogue, Jan. 1, 1984.
Pilgrim catalogue, Sep. 1, 1985.

* cited by examiner

Primary Examiner—Stephen F. Gerrity

(57) ABSTRACT

A card display package and method for manufacturing same is provided. The card package includes a card carrier constructed of a synthetic sheet of paper laminated with a plastic material. The card package further includes a card constructed of the synthetic sheet of paper and laminated with the plastic material and having at least a portion of the card projecting from the card carrier. The card is integrally formed with and selectively detachable from the card carrier and is provided with an encodable magnetic strip extending transversely across the portion of the card projecting from the card carrier whereby the card may be swiped through an encoding device without removing the card from the card carrier.

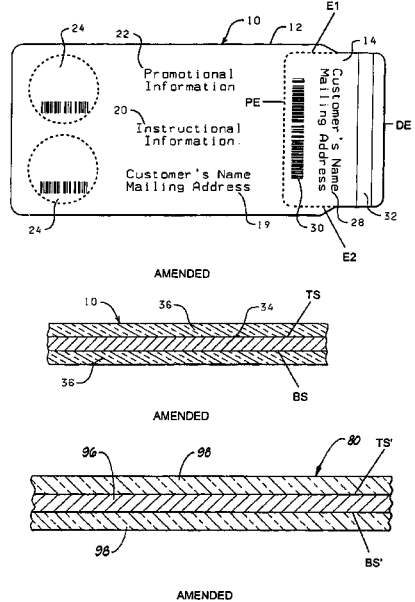

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 33–42:

Referring now to the drawings, and more particularly to FIG. 1, a card package 10 constructed in accordance with the present invention is shown. The card package 10 includes a card carrier 12 and an information card 14, such as a membership card or an identification card. The information card 14 is integrally formed with and selectively detachable from the card carrier 12 such that a unitary card package is provided which is sized to be inserted into an envelope 16 (FIG. 3). *The information card 14 has a first edge E1, an edge PE that is proximate to the card carrier 12, a second edge E2, and an edge DE that is distal from the card carrier 12.*

Column 3, line 66 through column 4, line 11:

FIG. 2 illustrates the card package 10 as being constructed of a sheet of material 34 *having a top side TS and a bottom side BS. The sheet of material 34* is laminated on each side thereof with a transparent plastic material 36, such as a polyester/polyethylene material. The sheet of material 34 is preferably a synthetic paper, such as [teslin] *TESLIN®* sheet, but any durable material capable of receiving printed matter or encodable matter can be used. The plastic material 36 provides the sheet of material 34 with a protective cover to increase the life of the card package 10 and provides the card package 10 with a certain degree of rigidity which facilitates the handling of the card package 10. The plastic material 36 is bonded to the sheet of material 34 in a conventional manner well known in the art.

Column 6, lines 31–45:

The card display package 80 is contructed in a manner similar to that described above in reference to the card package 10. That is, as illustrated in FIG. 9, the card display package 80 is constructed of a sheet of material 96, *having a top side TS' and a bottom side BS',* laminated on each side thereof with a transparent plastic material 98, such as a polyester/polyethylene material. The sheet of material 96 is preferably a synthetic paper, such as [teslin] *TESLIN®* sheet, but any durable material capable of receiving printed matter or encodable matter can be used. The plastic material 98 provides the sheet of material 96 with a protective cover to increase the life of the card display package 80 and provides the card display package 80 with a certain degree of rigidity which facilitates the handling of the card display package 80. The plastic material 98 is bonded to the sheet of material 96 in a conventional manner well known in the art.

THE DRAWING FIGURES HAVE BEEN CHANGED AS FOLLOWS:

Reference labels E1, E2, PE and DE have been added to FIG. 1.

Reference labels TS and BS have been added to FIG. 2.

Reference labels TS' and BS' have been added to FIG. 9.

AS A RESULT OF REEXAMINATION, IT HAS BEEN DETERMINED THAT:

The patentability of claims 7–12 is confirmed.

Claims 1, 2 and 4–6 are cancelled.

Claim 3 is determined to be patentable as amended.

New claims 13–111 are added and determined to be patentable.

3. [The card display package of claim 1] *A card display package, comprising:*

*a card carrier constructed of a sheet of material;*

*a card connected to and selectively detachable from the card carrier, the card having a portion thereof extending beyond an outer edge of the card carrier and the card having an encodable magnetic strip extending transversely across the portion of the card extending beyond the outer edge of the card carrier;* wherein the card carrier is provided with an aperture for suspending the card carrier from a display peg; *and*

*wherein the card is a debit card.*

*13. The card display package of claim 7, wherein the card carrier includes at least one special function element that is selectively detachable from the card carrier.*

*14. The card display package of claim 7, wherein the card is integrally connected to and selectively detachable from the card carrier.*

*15. The card display package of claim 7, wherein the magnetic strip has unique customer data encoded thereon.*

*16. The card display package of claim 3, wherein the card is integrally connected to and selectively detachable from the card carrier.*

*17. The card display package of claim 16, wherein the card has first and second edges, wherein the magnetic strip extends substantially from the first edge of the card to the second edge of the card, wherein the magnetic strip is free from contact with the card carrier at the first edge of the card.*

*18. The card display package of claim 16, further comprising non-unique information disposed on the card carrier.*

*19. The card display package of claim 18, wherein the non-unique information comprises promotional information relating to an establishment distributing the card.*

*20. The card display package of claim 19, wherein the card carrier has a top side and bottom side, and wherein the promotional information is disposed on the top side of the card carrier.*

*21. The card display package of claim 20, wherein the card has a top side and a bottom side and wherein the magnetic strip is disposed on the bottom side of the card.*

*22. The card display package of claim 19, wherein the promotional information is for promoting the establishment distributing the card.*

*23. The card display package of claim 18, wherein the non-unique information comprises instructional information relating to use of the card.*

24. The card display package of claim 23, wherein the card carrier has a top side and bottom side, and wherein the instructional information is disposed on the bottom side of the card carrier.

25. The card display package of claim 24, wherein the card has a top side and a bottom side, and wherein the magnetic strip is disposed on the bottom side of the card.

26. The card display package of claim 23, wherein the instructional information provides instructions for using the card.

27. The card display package of claim 16, wherein the card carrier is provided with the aperture for suspending the card carrier and the card from the display peg.

28. The card display package of claim 3, wherein the card is detachable from the card carrier at an area of weakness, and wherein the aperture is not proximate to the area of weakness.

29. The card display package of claim 3, wherein the card carrier includes a first edge proximate to the card and a second edge not proximate to the card, and wherein the aperture is positioned closer to the second edge than the first edge.

30. A card display package, comprising:

a card carrier constructed of a sheet of material;

a card connected to and selectively detachable from the card carrier, the card having a portion thereof extending beyond an outer edge of the card carrier and the card having an encodable magnetic strip extending transversely across the portion of the card extending beyond the outer edge of the card carrier;

wherein the card has first and second edges, wherein the magnetic strip extends substantially from the first edge of the card to the second edge of the card, wherein the magnetic strip is free from contact with the card carrier at the first edge of the card;

wherein the magnetic strip has unique customer data encoded thereon; and non-unique information disposed on the card carrier, wherein the non-unique information comprises promotional information relating to an establishment distributing the card.

31. The card display package of claim 30, wherein the card is integrally connected to and selectively detachable from the card carrier.

32. The card display package of claim 31, wherein the card carrier has a top side and a bottom side, wherein the promotional information is disposed on the top side of the card carrier.

33. The card display package of claim 32, wherein the card has a top side and a bottom side, and wherein the magnetic strip is disposed on the bottom side of the card.

34. The card display package of claim 33, further comprising second non-unique information disposed on the bottom side of the card carrier, wherein the second non-unique information comprises instructional information relating to use of the card.

35. The card display package of claim 34, wherein the instructional information provides instructions for using the card.

36. The card display package of claim 31, wherein the unique customer data can be accessed by a reader when the card is detached from the card carrier.

37. The card display package of claim 31, wherein the card has a distal edge that is free from contact with the card carrier, and wherein the magnetic strip is substantially parallel to the distal edge.

38. The card display package of claim 31, wherein the card carrier and the card are laminated with a transparent plastic material.

39. The card display package of claim 38, wherein the card carrier and the card are laminated with a transparent plastic material that covers substantially all of the card carrier and the card.

40. The card display package of claim 31, wherein the card has a distal edge that is free from contact with the card carrier, and wherein the magnetic strip is spaced at a substantially uniform distance from the distal edge.

41. The card display package of claim 31, wherein the card has a length associated therewith, wherein the magnetic strip has a length associated therewith, and wherein the length of the card is substantially equal to the length of the magnetic strip.

42. The card display package of claim 41, wherein the card has a distal edge that is free from contact with the card carrier, and wherein the magnetic strip is spaced at a substantially uniform distance from the distal edge along substantially the length of the card.

43. The card display package of claim 31, wherein the card carrier includes at least one special function element that is selectively detachable from the card carrier.

44. The card display package of claim 30, wherein the card and the card carrier are formed in a coplanar relationship.

45. The card display package of claim 30, wherein the promotional information is for promoting the establishment distributing the card.

46. A card display package, comprising:

a card carrier constructed of a sheet of material;

a card connected to and selectively detachable from the card carrier, the card having a portion thereof extending beyond an outer edge of the card carrier and the card having an encodable magnetic strip extending transversely across the portion of the card extending beyond the outer edge of the card carrier;

wherein the card has first and second edges, wherein the magnetic strip extends substantially from the first edge of the card to the second edge of the card, wherein the magnetic strip is free from contact with the card carrier at the first edge of the card;

wherein the magnetic strip has unique customer data encoded thereon; and non-unique information disposed on the card carrier, wherein the non-unique information comprises instructional information relating to use of the card.

47. The card display package of claim 46, wherein the card is integrally connected to and selectively detachable from the card carrier.

48. The card display package of claim 47, wherein the card carrier has a top side and a bottom side, wherein the instructional information is disposed on the bottom side of the card carrier.

49. The card display package of claim 48, wherein the card has a top side and a bottom side, and wherein the magnetic strip is disposed on the top side of the card.

50. The card display package of claim 49, further comprising second non-unique information disposed on the top side of the card carrier, wherein the second non-unique information comprises promotional information relating to an establishment distributing the card.

51. The card display package of claim 50, wherein the promotional information is for promoting the establishment distributing the card.

52. The card display package of claim 47, wherein the unique customer data can be accessed by a reader when the card is detached from the card carrier.

53. The card display package of claim 47, wherein the card has a distal edge that is free from contact with the card carrier, and wherein the magnetic strip is substantially parallel to the distal edge.

54. The card display package of claim 47, wherein the card carrier and the card are laminated with a transparent plastic material.

55. The card display package of claim 54, wherein the card carrier and the card are laminated with a transparent plastic material that covers substantially all of the card carrier and the card.

56. The card display package of claim 47, wherein the card has a distal edge that is free from contact with the card carrier, and wherein the magnetic strip is spaced at a substantially uniform distance from the distal edge.

57. The card display package of claim 47, wherein the card has a length associated therewith, wherein the magnetic strip has a length associated therewith, and wherein the length of the card is substantially equal to the length of the magnetic strip.

58. The card display package of claim 57, wherein the card has a distal edge that is free from contact with the card carrier, and wherein the magnetic strip is spaced at a substantially uniform distance from the distal edge along substantially the length of the card.

59. The card display package of claim 47, wherein the card carrier includes at least one special function element that is selectively detachable from the card carrier.

60. The card display package of claim 46, wherein the card and the card carrier are formed in a coplanar relationship.

61. The card display package of claim 46, wherein the instructional information provides instructions for using the card.

62. A card display package, comprising:
a card carrier constructed of a sheet of material;
a card connected to and selectively detachable from the card carrier, the card having a portion thereof extending beyond an outer edge of the card carrier and the card having an encodable magnetic strip extending transversely across the portion of the card extending beyond the outer edge of the card carrier, and the magnetic strip having unique customer data encoded thereon;
wherein the card has first and second edges, wherein the magnetic strip extends substantially from the first edge of the card to the second edge of the card, wherein the magnetic strip is free from contact with the card carrier at the first edge of the card;
wherein the card has a distal edge and a length, wherein the magnetic strip is spaced at a substantially uniform distance from the distal edge along substantially the length of the card; and
non-unique information disposed on the card carrier, wherein the non-unique information comprises promotional information relating to an establishment distributing the card.

63. The card display package of claim 62, wherein the card is integrally connected to and selectively detachable from the card carrier.

64. The card display package of claim 63, wherein the card carrier has a top side and a bottom side, wherein the promotional information is disposed on the top side of the card carrier.

65. The card display package of claim 64, further comprising second non-unique information disposed on the bottom side of the card carrier, wherein the second non-unique information comprises instructional information relating to use of the card.

66. The card display package of claim 65, wherein the card has a top side and a bottom side, and wherein the magnetic strip is disposed on the bottom side of the card.

67. The card display package of claim 65, wherein the instructional information provides instructions for using the card.

68. The card display package of claim 63, wherein the unique customer data can be accessed by a reader when the card is detached from the card carrier.

69. The card display package of claim 63, wherein the distal edge of the card is free from contact with the card carrier, and wherein the magnetic strip is substantially parallel to the distal edge.

70. The card display package of claim 63, wherein the card carrier and the card are laminated with a transparent plastic material.

71. The card display package of claim 70, wherein the card carrier and the card are laminated with a transparent plastic material that covers substantially all of the card carrier and the card.

72. The card display package of claim 63, wherein the distal edge of the card is free from contact with the card carrier.

73. The card display package of claim 63, wherein the card carrier includes at least one special function element that is selectively detachable from the card carrier.

74. The card display package of claim 63, wherein the magnetic strip is free from contact with the card carrier at the second edge of the card.

75. The card display package of claim 62, wherein the card and the card carrier are formed in a coplanar relationship.

76. The card display package of claim 62, wherein the promotional information is for promoting the establishment distributing the card.

77. A card display package, comprising:
a card carrier constructed of a sheet of material;
a card connected to and selectively detachable from the card carrier, the card having a portion thereof extending beyond an outer edge of the card carrier and the card having an encodable magnetic strip extending transversely across the portion of the card extending beyond the outer edge of the card carrier, and the magnetic strip having unique customer data encoded thereon;
wherein the card has first and second edges, wherein the magnetic strip extends substantially from the first edge of the card to the second edge of the card, wherein the magnetic strip is free from contact with the card carrier at the first edge of the card;
wherein the card has a distal edge and a length, wherein the magnetic strip is spaced at a substantially uniform distance from the distal edge along substantially the length of the card; and
non-unique information disposed on the card carrier, wherein the non-unique information comprises instructional information relating to use of the card.

78. The card display package of claim 77, wherein the card is integrally connected to and selectively detachable from the card carrier.

79. The card display package of claim 78, wherein the card carrier has a top side and a bottom side, wherein the instructional information is disposed on the bottom side of the card carrier.

80. The card display package of claim 79, further comprising second non-unique information disposed on the bottom side of the card carrier, wherein the second non-unique information comprises promotional information relating to an establishment distributing the card.

81. The card display package of claim 80, wherein the card has a top side and a bottom side, and wherein the magnetic strip is disposed on the top side of the card.

82. The card display package of claim 80, wherein the promotional information is for promoting the establishment distributing the card.

83. The card display package of claim 78, wherein the unique customer data can be accessed by a reader when the card is detached from the card carrier.

84. The card display package of claim 78, wherein the distal edge of the card is free from contact with the card carrier and wherein the magnetic strip is substantially parallel to the distal edge.

85. The card display package of claim 78, wherein the card carrier and the card are laminated with a transparent plastic material.

86. The card display package of claim 85, wherein the card carrier and the card are laminated with a transparent plastic material that covers substantially all of the card carrier and the card.

87. The card display package of claim 78, wherein the distal edge of the card is free from contact with the card carrier.

88. The card display package of claim 78, wherein the card carrier including at least one special function element that is selectively detachable from the card carrier.

89. The card display package of claim 78, wherein the magnetic strip is free from contact with the card carrier at the second edge of the card.

90. The card display package of claim 77, wherein the card and the card carrier are formed in a coplanar relationship.

91. The card display package of claim 77, wherein the instructional information provides instructions for using the card.

92. A card display package, comprising:
a card carrier constructed of a sheet of material;
a card conencted to and selectively detachable from the card carrier, the card having a portion thereof extending beyond an outer edge of the card carrier and the card having an encodable magnetic strip extending transversely across the portion of the card extending beyond the outer edge of the card carrier, and the card having unique customer data thereon;
wherein the card has proximate and first edges, wherein the proximate edge of the card is in contact with the first edge of the card, wherein the card is detachable from the card carrier at the proximate and first edges; and
wherein the card has a second edge, wherein the magnetic strip extends substantially from the first edge of the card to the second edge of the card, wherein the magnetic strip is free from contact with the card carrier at the second edge of the card.

93. The card display package of claim 92, wherein the card is integrally connected to and selectively detachable from the card carrier.

94. The card display package of claim 93, wherein the magnetic strip is free from contact with the card carrier at the first edge of the card.

95. The card display package of claim 93, wherein the card has a distal edge that is free from contact with the card carrier.

96. The card display package of claim 93, wherein the card has a distal edge, and the magnetic strip is substantially parallel to the distal edge.

97. The card display package of claim 93, wherein card has a distal edge, and the magnetic strip is spaced at a substantially uniform distance from the distal edge.

98. The card display package of claim 97, wherein the card has a length, wherein the magnetic strip is spaced at a substantially uniform distance from the distal edge along substantially the length of the card.

99. The card display package of claim 93, further comprising non-unique information disposed on the card carrier, wherein the non-unique information comprises promotional information relating to an establishment distributing the card.

100. The card display package of claim 99, wherein the promotional information is for promoting the establishment distributing the card.

101. The card display package of claim 93, further comprising the non-unique information disposed on the card carrier, wherein the non-unique information comprises instructional information relating to relating to use of the card.

102. The card display package of claim 101, wherein the instructional information provides instructions for using the card.

103. A card display package, comprising:
a card carrier constructed of a sheet of material;
a card connected to and selectively detachable from the card carrier, the card having a portion thereof extending beyond an outer edge of the card carrier and the card having an encodable magnetic strip extending transversely across the portion of the card extending beyond the outer edge of the card carrier, and the card having unique customer data thereon;
wherein the card has proximate and first edges, wherein the proximate edge of the card is substantially perpendicular to the first edge of the card, wherein the card is detachable from the card carrier at the proximate and first edges; and
wherein the card has a second edge, wherein the magnetic strip extends substantially from the first edge of the card to the second edge of the card, wherein the magnetic strip is free from contact with the card carrier at the second edge of the card.

104. The card display package of claim 103, wherein the card is integrally connected to and selectively detachable from the card carrier.

105. The card display package of claim 104, wherein the magnetic strip is free from contact with the card carrier at the first edge of the card.

106. The card display package of claim 104, wherein the card has a distal edge that is free from contact with the card carrier.

107. The card display package of claim 104, wherein the card has a distal edge, and the magnetic strip is substantially parallel to the distal edge.

108. The card display package of claim 104, wherein the card has a distal edge, and the magnetic strip is spaced at a substantially uniform distance from the distal edge.

109. The card display package of claim 108, wherein the card has a length, wherein the magnetic strip is spaced at a substantially uniform distance from the distal edge along substantially the length of the card.

110. The card display package of claim 104, further comprising non-unique information disposed on the card carrier, wherein the non-unique information comprises promotional information relating to an establishment distributing the card.

111. The card display package of claim 104, further comprising non-unique information disposed on the card carrier, wherein the non-unique information comprises instructional information relating to relating to use of the card.

* * * * *